US009235206B2

(12) United States Patent
Benedict et al.

(10) Patent No.: US 9,235,206 B2
(45) Date of Patent: Jan. 12, 2016

(54) APPARATUS FOR FINDING A MACHINE TOOL ORIGIN

(71) Applicant: Beneficial Photonics, Inc., Fremont, CA (US)

(72) Inventors: George Benedict, Fremont, CA (US); Susan Coleman, Oceanside, CA (US)

(73) Assignee: Beneficial Photonics, Inc., Fremont, CA (US)

( * ) Notice: Subject to any disclaimer, the term of this patent is extended or adjusted under 35 U.S.C. 154(b) by 260 days.

(21) Appl. No.: 14/044,812

(22) Filed: Oct. 2, 2013

(65) Prior Publication Data

US 2015/0091489 A1  Apr. 2, 2015

(51) Int. Cl.
*G01B 5/004*    (2006.01)
*B23Q 3/18*     (2006.01)
*G05B 19/401*   (2006.01)

(52) U.S. Cl.
CPC .. *G05B 19/4015* (2013.01); *G05B 2219/50042* (2013.01); *G05B 2219/50137* (2013.01)

(58) Field of Classification Search
CPC ...... G01B 5/0002; G01B 5/004; G01B 5/008; G05B 2219/50031; G05D 3/12; G05D 3/125; B23Q 3/18; B23Q 3/183; B23Q 3/186; B23Q 17/22; B23Q 17/225; B23Q 17/2266; B23Q 17/2275
USPC ...................... 33/502; 73/1.79, 1.81; 318/601
See application file for complete search history.

(56) References Cited

U.S. PATENT DOCUMENTS

| | | |
|---|---|---|
| 3,999,299 A | 12/1976 | Johnson |
| 5,204,507 A | 4/1993 | Saeda et al. |
| 5,272,818 A | 12/1993 | Youden et al. |
| 5,522,147 A | 6/1996 | Tully et al. |
| 5,825,666 A | 10/1998 | Freifeld |
| 5,929,584 A * | 7/1999 | Gunnarsson et al. .... 318/568.16 |
| 5,978,326 A | 11/1999 | Shido |
| 6,339,706 B1 | 1/2002 | Tillgren et al. |
| 6,732,009 B2 * | 5/2004 | Shirakawa et al. ........... 700/193 |
| 7,066,100 B2 | 6/2006 | Katayama |
| 7,097,399 B2 | 8/2006 | Winfough et al. |

(Continued)

FOREIGN PATENT DOCUMENTS

WO   WO 2013157081 A1 * 10/2013 ............. B23Q 17/00

OTHER PUBLICATIONS

International Search Report and Written Opinion issued to International Patent Application No. PCT/US14/58256, Dec. 24, 2014, 10 pgs.

*Primary Examiner* — R. A. Smith
(74) *Attorney, Agent, or Firm* — Cooley LLP

(57) ABSTRACT

An apparatus for finding a machine tool origin includes a probe, a base, and a sensor positioned on a first side of the base. Probe engagement components are configured for movable engagement with a probe of the machine tool to produce electronic signals processed by electronic circuitry to provide a signal indicative of the machine tool origin. Mechanical positioning components are positioned on a second side of the base. The mechanical positioning components include a pedestal with a first tab (301) and a second tab (302) aligned to be operable as a mechanical stop with the first tab (301) corresponding to a position of a left-hand origin (107) for the machine tool and the first tab (301) and a third tab (303) aligned to be operable as a mechanical stop with the first tab (301) corresponding to a position of a right-hand origin (108) for the machine tool.

18 Claims, 10 Drawing Sheets

(56) References Cited

U.S. PATENT DOCUMENTS

| | | |
|---|---|---|
| 7,252,466 B1 | 8/2007 | Roch |
| 7,706,642 B2 | 4/2010 | Benedict |
| 8,001,859 B2 | 8/2011 | McMurtry et al. |
| 8,061,052 B2 * | 11/2011 | Song et al. ............ 33/502 |
| 8,312,901 B2 | 11/2012 | Goldbrunner |
| 2004/0107073 A1 * | 6/2004 | Sakurada et al. ........ 702/167 |
| 2013/0221070 A1 | 8/2013 | Okuno et al. |

* cited by examiner

```
Internal Circuit Diagrams
A. LTP-747
```

APPARATUS FOR FINDING A MACHINE TOOL ORIGIN

FIELD OF THE INVENTION

This invention relates generally to machine tools, such as milling machines. More particularly, this invention relates to an apparatus for finding a machine tool origin.

BACKGROUND OF THE INVENTION

Presently, an edge finder is typically used by a machinist to find a point on an axis, say an X axis, and then an edge finder is used again to find another point on a second axis, say a Y axis. The intersection of these two axes defines an origin. It is desirable to locate the origin directly, thereby saving the machinist time and otherwise simplifying the process. In addition, a single point direct determination of the origin may be more accurate than two separate edge finder measurements and the required extrapolation to the origin.

U.S. Pat. No. 3,999,299 discloses an edge finder that is still popular today. A rotating cylinder contains an off-axis spring. The visual inspection of cylinder wobble indicates the point where the edge finder touches the part to be machined, thereby determining a point on an axis. It is desirable to minimize the guesswork used for wobble estimation in the process of edge detection. For example, an origin determination may also include an indication that the origin is being approached, and an indication that the origin has been passed, with the inherent option for the machinist to pass by and then return to the right spot at the origin.

U.S. Pat. Nos. 5,272,818 and 5,522,147 disclose calculations and extrapolations to deduce an origin. The patents do not address the concept of right-handed and left-handed origins as being useful to a machinist.

In view of the foregoing, it would be desirable to provide improved techniques for identifying a machine tool origin.

SUMMARY OF THE INVENTION

An apparatus for finding a machine tool origin includes a probe, a base, and a sensor positioned on a first side of the base. The sensor includes probe engagement components and electronic circuitry. The probe engagement components are configured for movable engagement with a probe of the machine tool to produce electronic signals processed by the electronic circuitry to provide a signal indicative of the machine tool origin. Mechanical positioning components are positioned on a second side of the base. The mechanical positioning components include a pedestal with a first tab (301) and a second tab (302) aligned to be operable as a mechanical stop with the first tab (301) corresponding to a position of a left-hand origin (107) for the machine tool and the first tab (301) and a third tab (303) aligned to be operable as a mechanical stop with the first tab (301) corresponding to a position of a right-hand origin (108) for the machine tool.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention is used in connection with a machine tool, such as a milling machine. A milling machine is a device used to machine a part by removing material from the part using a rotary cutter of the milling machine. The milling machine may be controlled manually or by a computer.

Figure 1A:
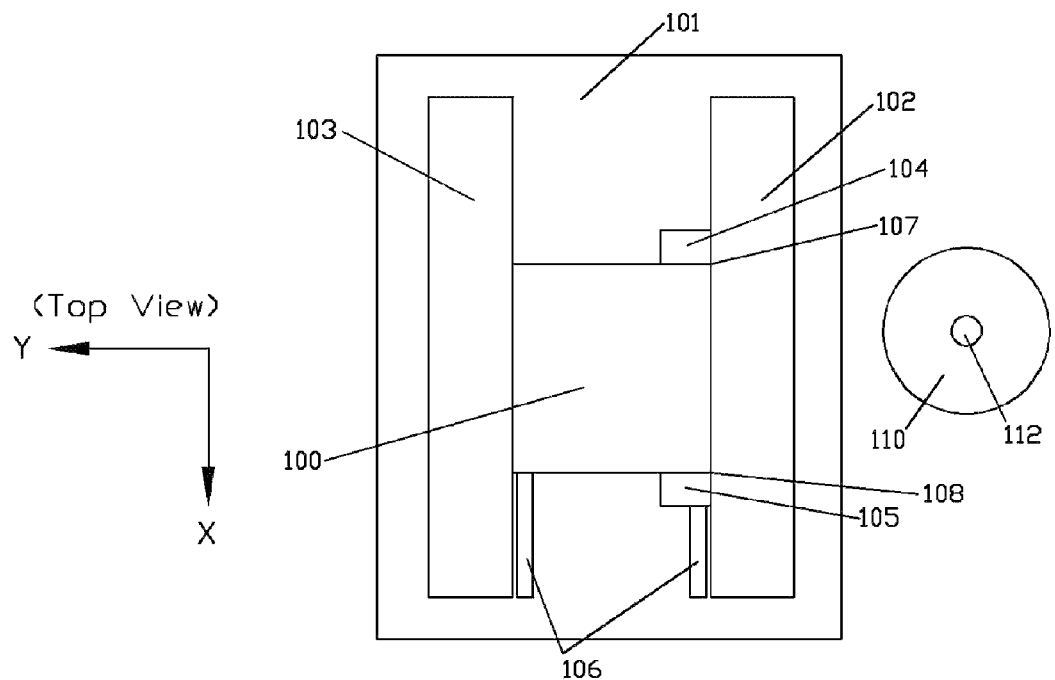
FIG. 1A is a top view of elements of a milling machine.

FIG. 1A is a top view of a chuck 110 of a milling machine, which is used to hold a rotary cutter 112. The rotary cutter may be a drill, reamer, tap, cutter, or end mill. The chuck 110 is capable of rotating and maintaining a fixed vertical axis, Zc, during rotation. The fixed rotation axis, Zc, is in the Z-coordinate direction, and is fixed in the X-coordinate and the Y-coordinate. FIG. 1A also illustrates a table 101 associated with the milling machine. The table 101 supports a part to be machined 100. Movement on the table 101 may be in any of the X-coordinate, Y-coordinate, and Z-coordinate axis directions, and the location is defined by Xt, Yt, and Zt coordinates. The three axes are all substantially perpendicular to each other. The Zt axis of the table 101 is substantially parallel to the Zc axis defined by the chuck 110.

The principal function of the origin finder is to determine the special location, the origin of the table, in Xt and Yt coordinates, that places the table at the fixed rotation axis defined by the chuck, thereby making the Zt axis and Zc axis vectors substantially identical in their X and Y coordinates. Subsequent machining operations may then be made by moving the table, in X-coordinate and Y-coordinate directions relative to this origin.

Typically, the table 101 holds a vise with a fixed jaw 102 and a movable clamping jaw 103. The vise secures the part to be machined 100 to the table 101. The axis of the fixed jaw 102 is substantially in the Xt direction. The vise may have a left-hand stop 104 for specification of the Yt axis at the left-hand edge, thereby specifying the left-hand origin 107.

The vise may also have a right-hand stop 105 for specification of the Yt axis at the right-hand edge, thereby specifying the right-hand origin 108. Either the right-hand edge or the left-hand edge stops are used, depending on the definition in the engineering drawing.

FIG. 1A also illustrates parallels 106. Parallels are substantially identical square prisms with all eight corners having faces that are substantially perpendicular. Parallels 106 are typically placed on the table 101, inside the vise; they are used to locate the Zt axis of the part to be machined 100.

Procedures for adjusting all the previously described axes, Zc, Xt, Yt, and Zt, are provided with the milling machine. Failure of these axes to be mutually perpendicular and/or parallel results in errors that diminish the accuracy of fabricated parts. An engineering drawing is used to define the desired requirements for machining a part including the accuracy, the origin and the coordinates of features on the part.

As previously indicated, an origin may be left-handed or right-handed. The conditions for determining whether an origin is right-handed or left-handed may be provided by the vector cross product using the curl operator as described in the reference "Physics" by Resnick and Halliday 1966. When the curl of the positive X-axis with the positive Y-axis results in a positive Z-axis, then the origin is right-handed. If the result is a negative Z-axis then the origin is left-handed. When the origin is right-handed, it is located on the milling machine table 101 at 108, and when the origin is left-handed, it is located on the milling machine table 101 at 107.

Figure 1B:
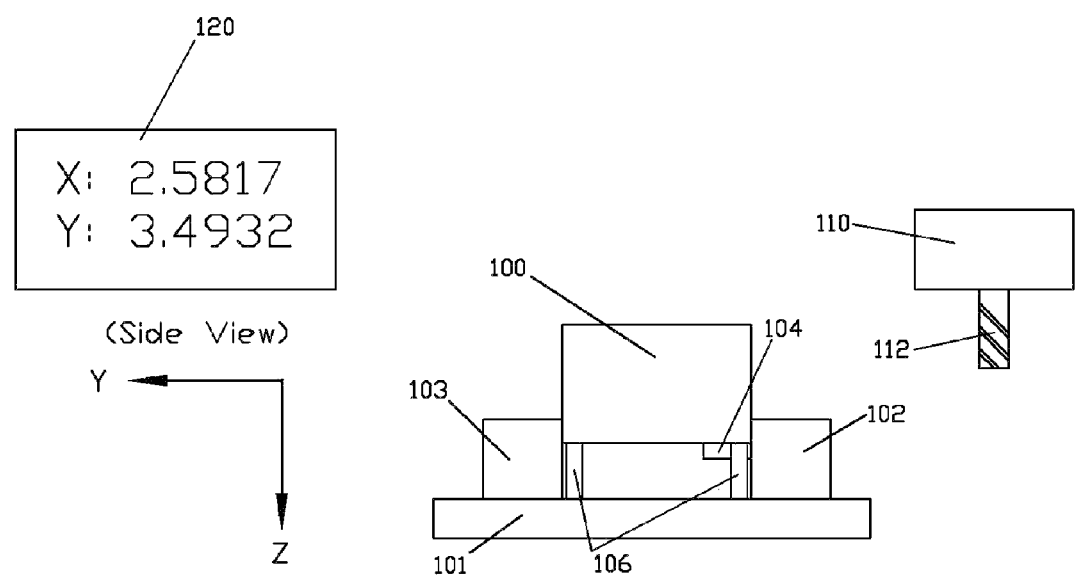
FIG. 1B is a side view of elements of a milling machine.

FIG. 1B is a side view of the components of FIG. 1A. The figure illustrates how the table 101 supports the fixed jaw 102 and the movable clamping jaw 103 to secure part 100. The figure also illustrates how the parallels 106 position the part 100 at a desired vertical axis position. FIG. 1B illustrates the left-hand stop 104. The figure also illustrates the chuck 110 and cutter 112.

While FIG. 1B illustrates the left-hand stop 104 to define the left hand origin 107, an experienced machinist may use both left-hand and right-hand origins-to machine the part, depending on convenience and the engineering drawing. However, each time a new origin is selected the machinist must determine the new origin, using the machine tool origin finder digital readouts of the invention. Once the desired table position is located for the new origin in the X-coordinate and the Y-coordinate, the machinist zeros the milling machine digital readout 120 in both X and Y axes.

The milling machine digital readout 120 may indicate both positive or negative readings corresponding to the axes of the machined part 100. The table axes are in the opposite direction from the part axes. That is, moving the table in the negative Xt axis moves the cutter 112 in the positive X axis with respect to the machined part 100. The axes of the machined part 100 are indicated by milling machine digital readout 120.

Figure 2A:
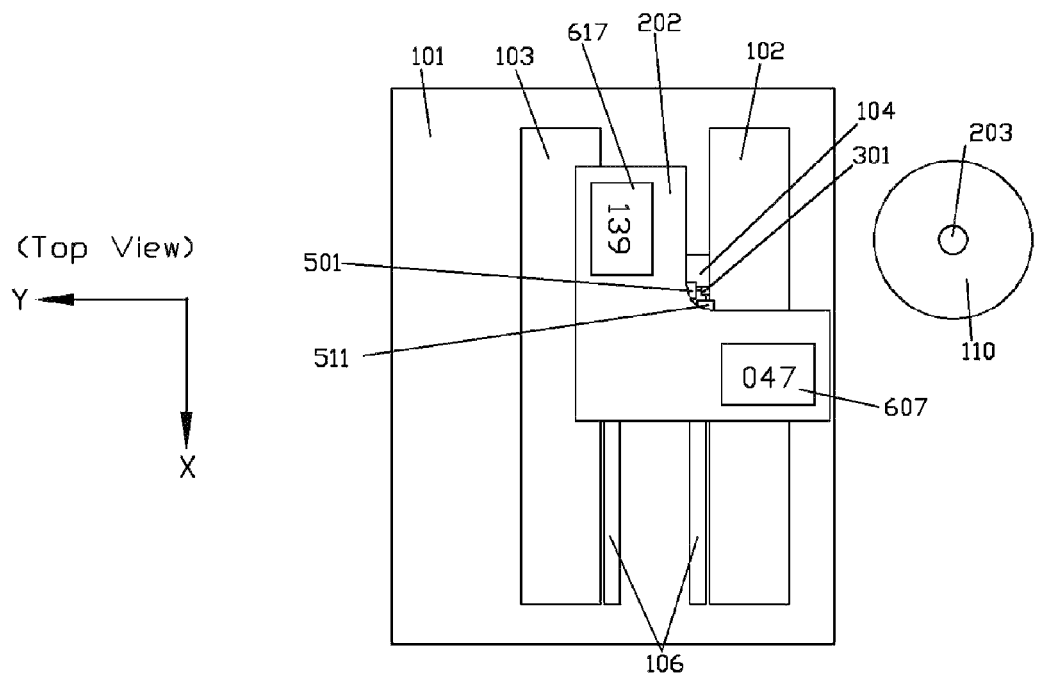
FIG. 2A is a top view of an apparatus for finding a machine tool origin in accordance with an embodiment of the invention.

FIG. 2A is a top view of a sensor 202 associated with the machine tool origin finder of the invention. The sensor 202 is positioned on the table 101. FIG. 2A also illustrates the previously discussed components: fixed jaw 102, movable clamping jaw 103 and parallels 106. The figure also illustrates chuck 110 with a probe 203.

Figure 2B:
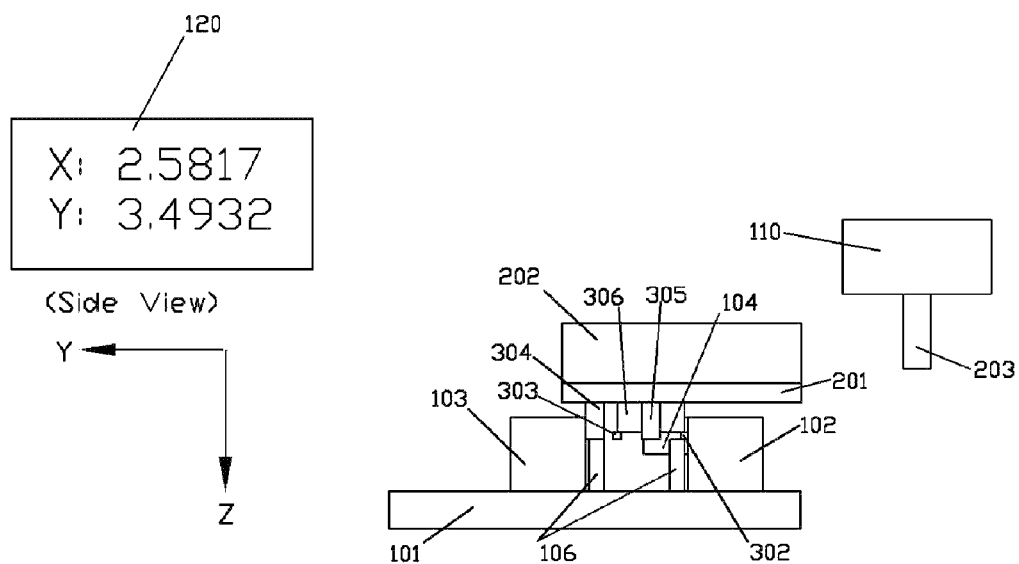
FIG. 2B is a side view of the apparatus of FIG. 2A.

As shown in FIG. 2B, the machine tool origin finder includes sensor 202 positioned on a first side of base 201. Mechanical positioning components are positioned on a second side of the base 201. The mechanical positioning components include a post 304, a pedestal 306, tab 302 and tab 301. The post 304 provides an independent support along the Z-axis. Tabs facilitate establishing origin position, as discussed below. The probe 203 is held in the chuck 110. The fixed jaw 102, fixed stop 104, and movable clamping jaw 103 may be used to engage mechanical positioning components, such as post 304 and tab 302.

The machinist guides the probe 203 to the origin using digital panel meter readouts 607 and 617 associated with an embodiment of the sensor 202. When these readouts are zero, the machinist has determined the origin and may then zero the digital readout 120 for both X and Y axes.

Figure 3A:
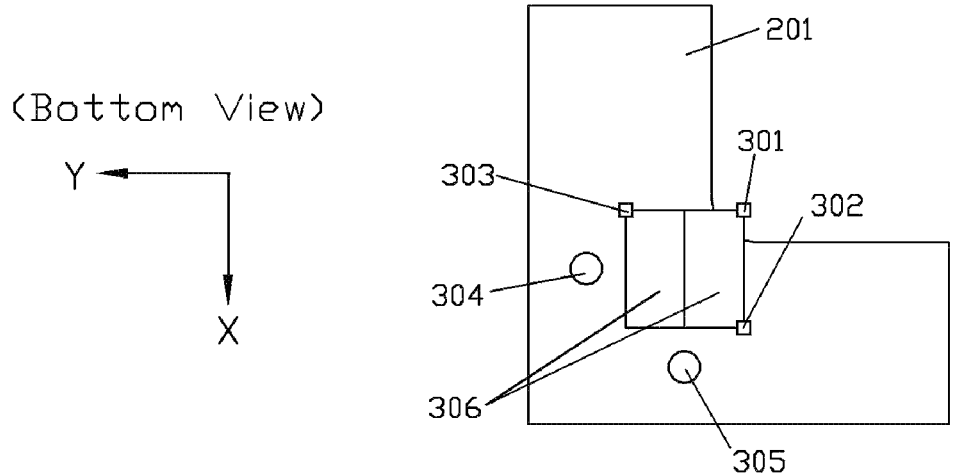
FIG. 3A is a bottom view of the base associated with the apparatus for finding a machine tool origin.
Figure 3B:
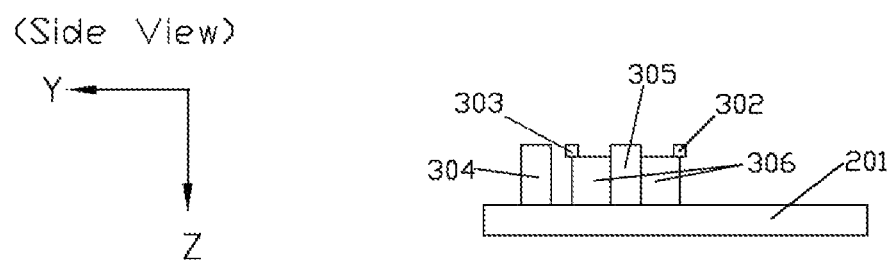
FIG. 3B is a side view of the apparatus of FIG. 3A.

Referring to FIGS. 3A and 3B, pedestal 306 is secured to the base 201. In one embodiment, the pedestal is made from two pieces 306, which may slide relative to each other along their common side. The small sliding allows a factory adjustment to insure that the three tabs are defining the three axes substantially in agreement with the table Xt and Yt axes. Once this factory adjustment is made the pedestal pieces 306 are fixed together.

Figure 4A:
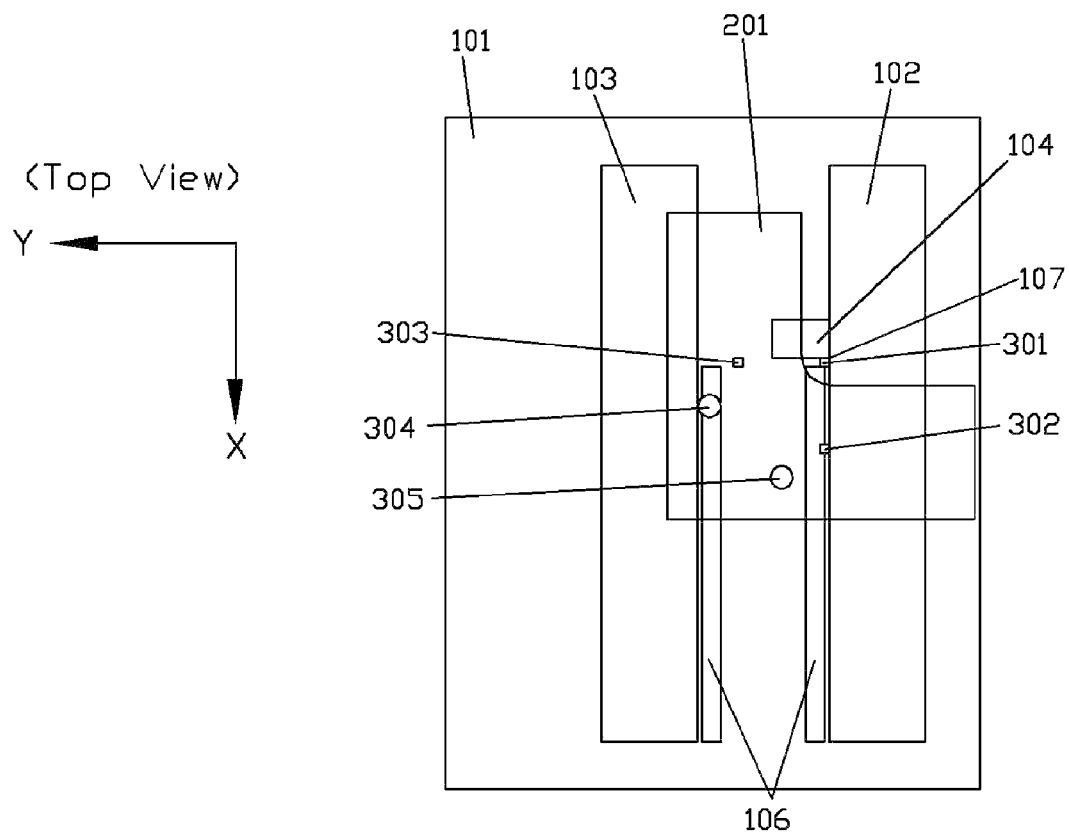
FIG. 4A is a top view of base tabs located at a left-hand origin.
Figure 4B:
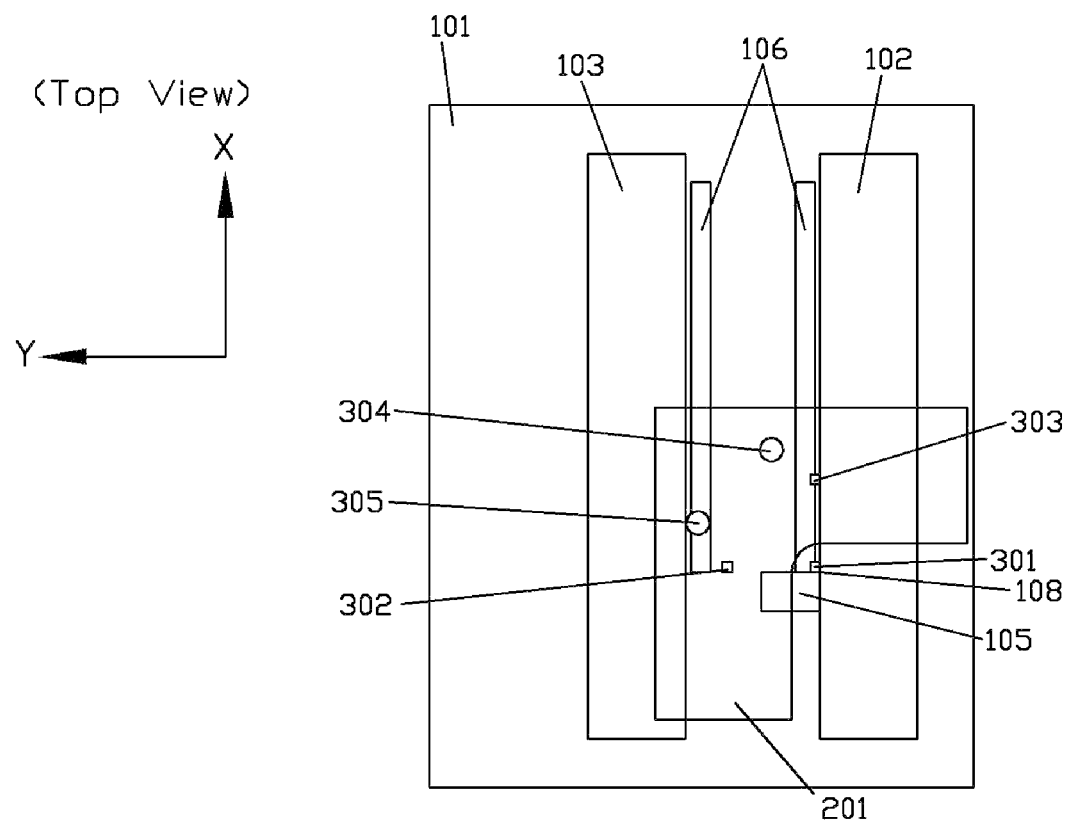
FIG. 4B is a top view of base tabs located at a right-hand origin.

The pedestal 306 holds first tab 301, second tab 302 and third tab 303. Tabs 302 and 301 are aligned with fixed vice 102 as shown in FIG. 4A with tab 301 corresponding to an origin position 107 in a first configuration. That is, for a left-hand origin 107 tab 301 and tab 302 are used along with clamp post 304. Tabs 303 and 301 are aligned with fixed vice 102 as shown in FIG. 4B with tab 301 corresponding to an origin position 108 in a second configuration. That is, for a right-hand origin 108 tab 301 and tab 303 are used along with clamp post 305.

FIG. 4A shows how these tabs fit into the elements of the milling machine in a first configuration previously described in FIGS. 1A and 1B. In FIG. 4A the base 201 is shown as being transparent so that the elements of the mechanical positioning components may be easily seen. The tabs and clamp post have a common "bottom" that sits on the parallels 106 to define the Zt location. Two of the three tabs, 301 and 302, engage the fixed jaw of the vise 102. This defines the Xt axis location. The Yt axis defining the left-hand origin 107 is determined by pushing tab 301 up against the stop 104. The base 201 is secured in place with the vise clamping jaw 103 pushing against clamp post 304.

FIG. 4B illustrates the origin finder oriented in a second configuration for a right-hand origin. For a right-hand origin, the base uses tab 301 tab 303 and clamp post 305. In this second configuration, the base 201 is rotated by 90 degrees from its position in FIG. 4A.

FIG. 4B shows how the tabs fit into the elements of the milling machine previously described in FIGS. 1A and 1B. In FIG. 4B the base 201 is shown as being transparent so that the elements below may be easily seen. The tabs and clamp post have a common "bottom" that sits on the parallels 106 to define the Zt location. Two of the three tabs, 301 and 303, engage the fixed jaw of the vise 102. This defines the Xt axis location. The last element, the Yt axis defining the right-hand origin 108, is determined by pushing tab 301 up against the stop 105. The base 201 is secured in place with the vise clamping jaw 103 pushing against clamp post 305.

Figure 5:
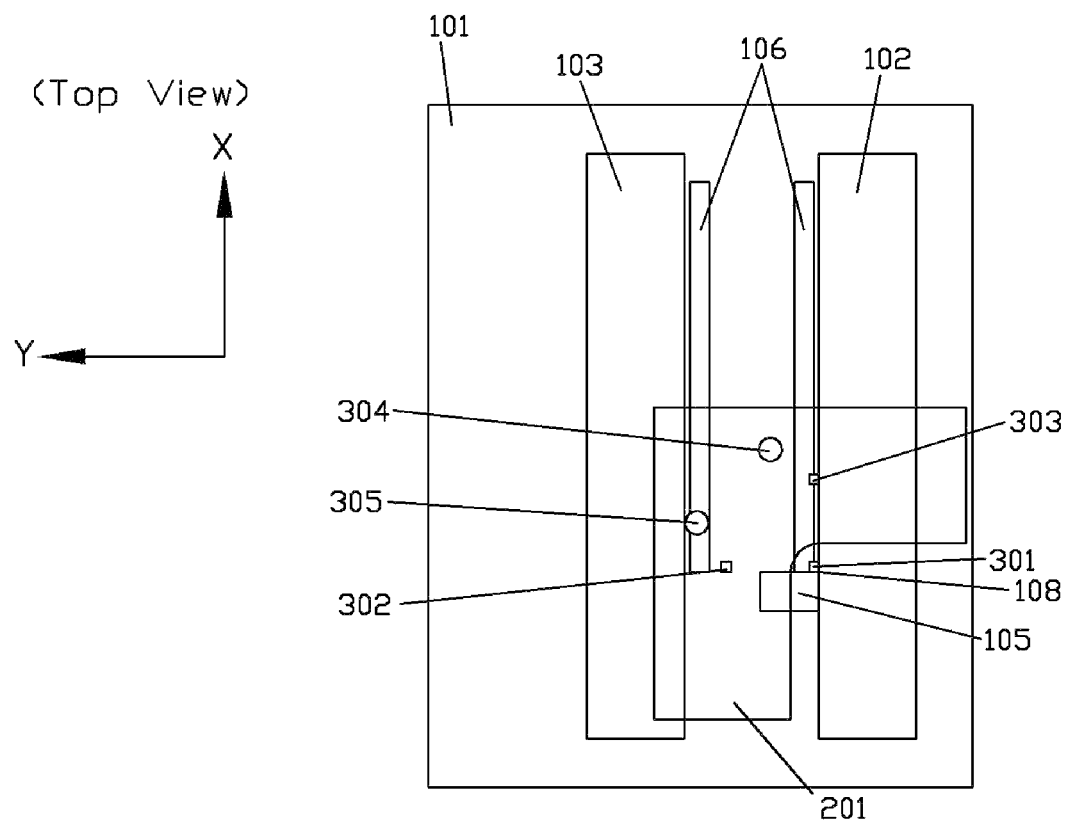
FIG. 5 is a top view of sensor components of the apparatus for finding a machine tool origin.

Sensor 202 components are shown in FIG. 5. In particular, the top of sensor 202 shown in the previous figures is removed to display the sensor components. The top cover shown in FIG. 2A contains two digital panel meters 607 and 617.

The sensor 202 includes probe engagement components and electronic circuitry. The probe engagement components may include two fins 501 and 511, which contact the probe 203. Fin 501 pushes a flexure 502 and thereby moves a shutter 504 in response to motion by the probe 203. Flexure 502 is held fixed at one end by clamp 503, where the clamp 503 is supported by the base 201.

Electronic circuitry associated with the sensor may include optical signal sensing circuitry 509 and 519. In one embodiment, LED 505 emits light rays 506, which substantially uniformly illuminate signal light detector 507. However, motion of shutter 504 in front of signal light detector 507 blocks a variable portion of light rays 506, thereby monotonically decreasing the signal from signal light detector 507 in response to motion of probe 203. Reference light detector 508 receives a fixed portion of light rays 506 at all times. Fin 511, has a similar set of mechanical and optical components 512-518 to provide a signal and reference for motion of fin 511 in response to motion of probe 203.

Figure 6:
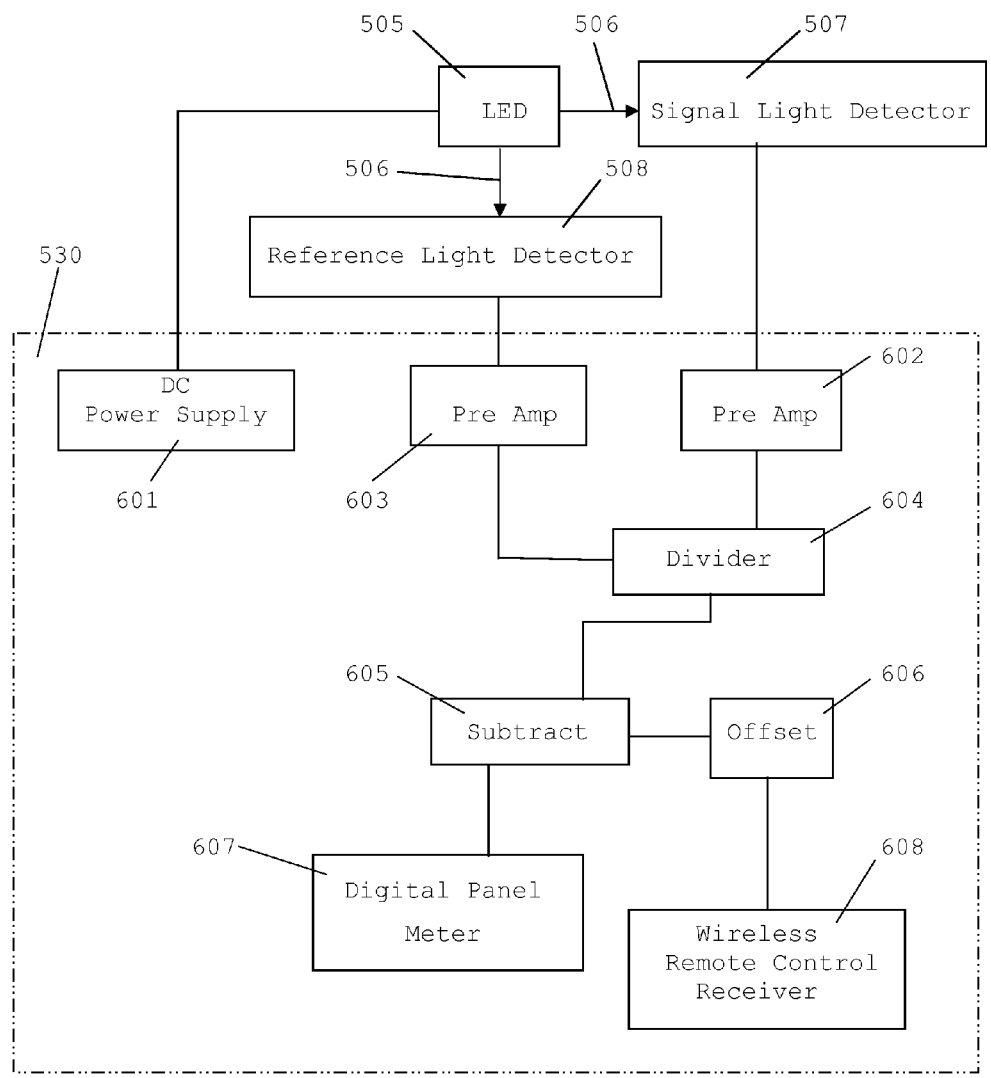
FIG. 6 illustrates electrical circuit elements associated with an embodiment of the sensor.

Electronic circuitry 530 associated with the sensor may also include signal processing circuitry, such as shown in FIG. 6. A DC power supply 601 provides a substantially constant voltage to drive LED 505. Signal light detector 507 and reference light detector 508 typically provide small currents to pre-amps 602 and 603. Divider 604 takes the ratio of the voltage from the pre-amp 602 to the voltage of pre-amp 603. The signal from pre-amp 603 is constant, while the signal from pre-amp 602 diminishes in size until it reaches zero when the shutter 504 blocks the signal path.

The signal from the offset 606 is subtracted from the signal from the divider 604. When the probe 203 is located at the origin, the offset 606 is adjusted so that the voltage to the digital panel meter 607 is zero. The offset signal adjustment may use both digital and analog potentiometers. The digital adjustment may be received from a wireless remote control receiver 608. The wireless remote control 608 may be used for calibration as described below. Alternately, the offset 606 may be manually adjusted using an analog potentiometer.

Returning to FIG. 5, the probe 203 is a cylinder (e.g., ⅜" in diameter and 2" long). A gage pin may be used (e.g., part number 5VUG1 as sold by Vermont Gage located in Swanton, Vt.). The gage pin may be hardened steel with an oxide coating, and may have a diameter with high accuracy within 0.0002".

A fixture similar to the chuck 110, is used to hold the probe 203 to make the initial zero setting at the factory. Both readings from the sensor 202 are adjusted to read zero when the probe 203 is held in the fixture centered over the origin.

In operation, the probe 203 is held in the chuck 110, shown in FIGS. 2A and 2B, and typically is not rotated. The sensor 202 mounted in the vise 102 and 103 is roughly positioned in the Zc axis so that the probe 203 may contact the two sensor fins 501 and 511, and depress them when the table 101 is positioned in Xt and Yt. The machinist positions the table 101 so that both readings from the sensor 202 read zero at the same time. This condition determines that the probe 203 is now located at the origin and the machinist may then zero the digital readouts 120. The probe 203 may now be replaced by a rotary cutter 112 and the part 100 fabricated according to instructions on the engineering drawing.

Figure 7A:
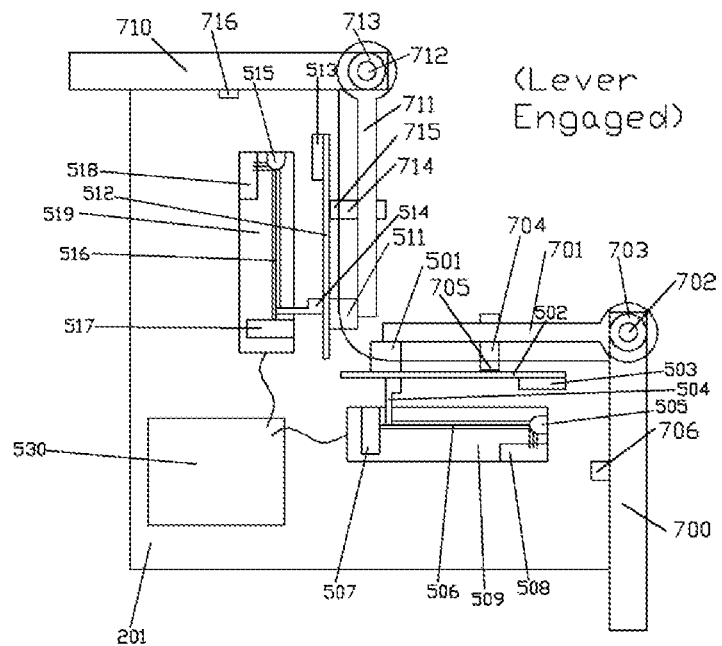
FIG. 7A illustrates calibration components associated with the apparatus for finding a machine tool origin, where lever components are engaged.
Figure 7B:
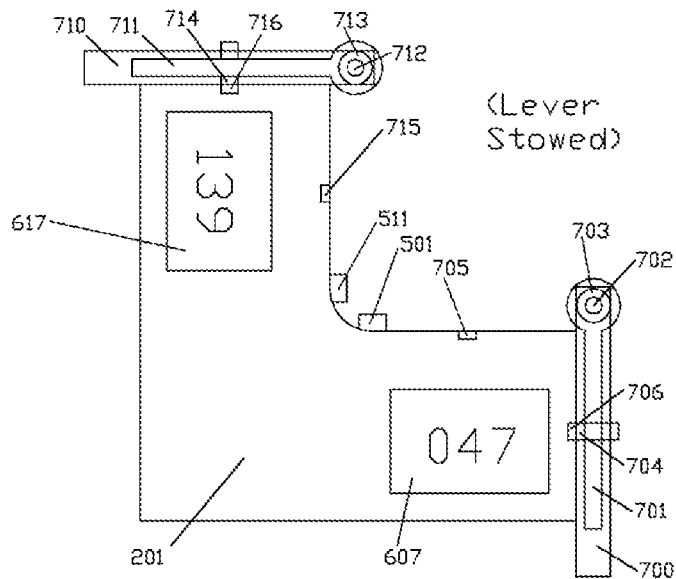
FIG. 7B illustrates calibration components associated with the apparatus for finding a machine tool origin, where lever components are stowed.

FIGS. 7A and 7B illustrate calibration components positioned on base 201. Two independent levers 701 and 711 rotate pre-determined amounts on shafts 702 and 712 to depress the sensor fins 501 and 511. This is equivalent to the probe 203 being in contact with the sensor fins 501 and 511 while located at the origin 300, thereby setting the correct position for the fins without having to use the probe 203 and the factory fixture that provided the initial calibration described above. The electronics offset 606 can then be adjusted, if necessary, to set zero output.

Levers 701 and 703 may be rotated on shafts 702 and 712 to stow them out of the way of the probe 203, when the origin finder has been calibrated and is ready for use.

FIG. 7A shows the levers 701 and 711 engaged with fins 501 and 511, with the top cover removed to show the sensor 202 components previously described in FIG. 5. Dowel pins 704 and 714 secured in the levers 701 and 711 are used to precisely locate the levers 701 and 711. Magnets 705 and 716 hold the dowel pins 704 and 714 to secure levers 701 and 711 in place.

In FIGS. 7A and 7B the endplate 700 is secured to the base 201. The endplate 700 is shown as being transparent so as to see the bearing 702 fixed in the endplate 700. The bearing 702 provides a substantially smooth rotation of shaft 702.

In FIG. 7B, with the top cover in place to show the digital panel meters 607 and 617, the lever 701 is stowed and magnet 706 serves to hold dowel pin 704 and thereby secure lever 701. Lever 711 similarly has an endplate 710, bearing 713, shaft 712, dowel pin 714, and magnets 715 and 716.

For convenience, a wireless remote control 608 can instruct the machinist to engage the levers 701 and 711 thereby setting the correct position for the fins for the calibration procedure. Next the wireless remote control 608 can both read the calibration signals from sensor 202 and set the electronics offset 606 signals to zero the signals from sensor 202. The wireless remote control 608 can be implemented using Bluetooth technology.

Figure 8:
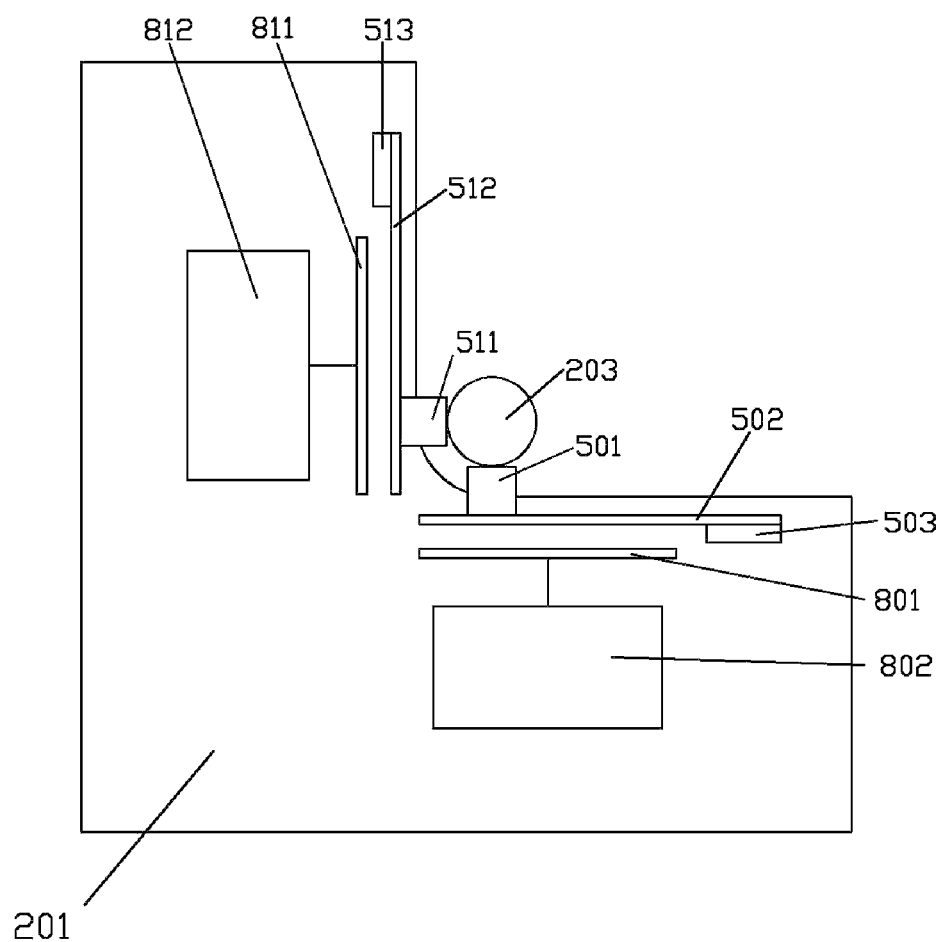
FIG. 8 illustrates an alternate embodiment for the sensor components.

A capacitive sensor may replace the disclosed optical sensor. As shown in FIG. 8, fin 501 moves flexure 502 relative to a fixed capacitor plate 801, producing a voltage from capacitive sensor 802. A second capacitive sensor 812 measures the position of fin 511, attached to flexure 512, which moves relative to a fixed capacitor plate 811, producing a voltage from capacitive sensor 812. The capacitive sensors 802 and 812 may be purchased from Omron in Kyoto, Japan, part number E2K-X4MF1. Signal processing circuits using the signals from the capacitor sensors function in a similar manner to the optical approach.

Those skilled in the art will appreciate that a variety of sensors may be utilized in accordance with embodiments of the invention. For example, the sensor may be selected from displacement, proximity or motion, and may be based on technology using inductance, magneto-striction, optical coherence and interference effects, Hall effect, and Doppler effect, to name only a few.

Figure 9A:
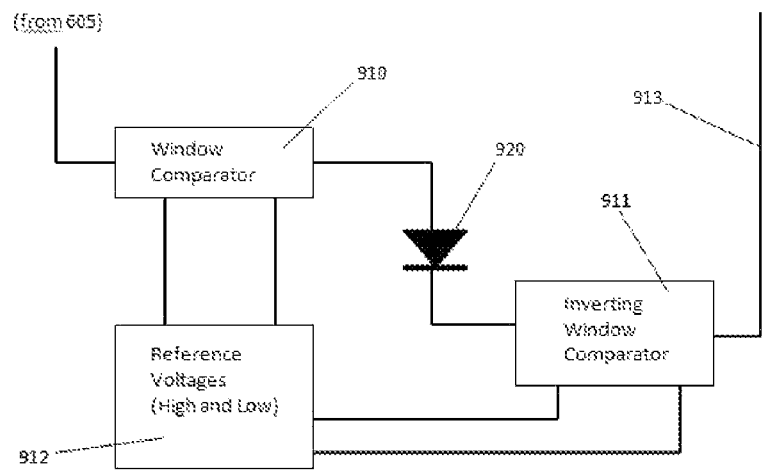
FIG. 9A illustrates a matrix display with a single LED activated in accordance with an embodiment of the invention.

Probe position output circuitry may include a digital display, such as 607 and 617 of FIG. 2A. Alternately, the probe position output circuitry may include a single LED operative to provide a visible output signal when the machine tool origin is identified. FIG. 9A illustrates circuitry to light an LED 920 using two analog signals from the sensor 202. The analog signal from 605 instead of going to panel meter digital display 607 goes to window comparator 910. High and low reference voltages 912 determine when window comparator 910 goes high. This digital signal then drives the anode of LED 920. The second analog signal from sensor 202 instead of going to panel digital display 617 goes on line 913 to inverting window comparator 911. High and low reference voltages 912 determine when inverting window comparator 911 goes low. This signal then drives the cathode of LED 920. When the two signal voltages from sensor 202 are within the window range of the reference voltages 912 the LED 920 is activated.

Figure 9B:
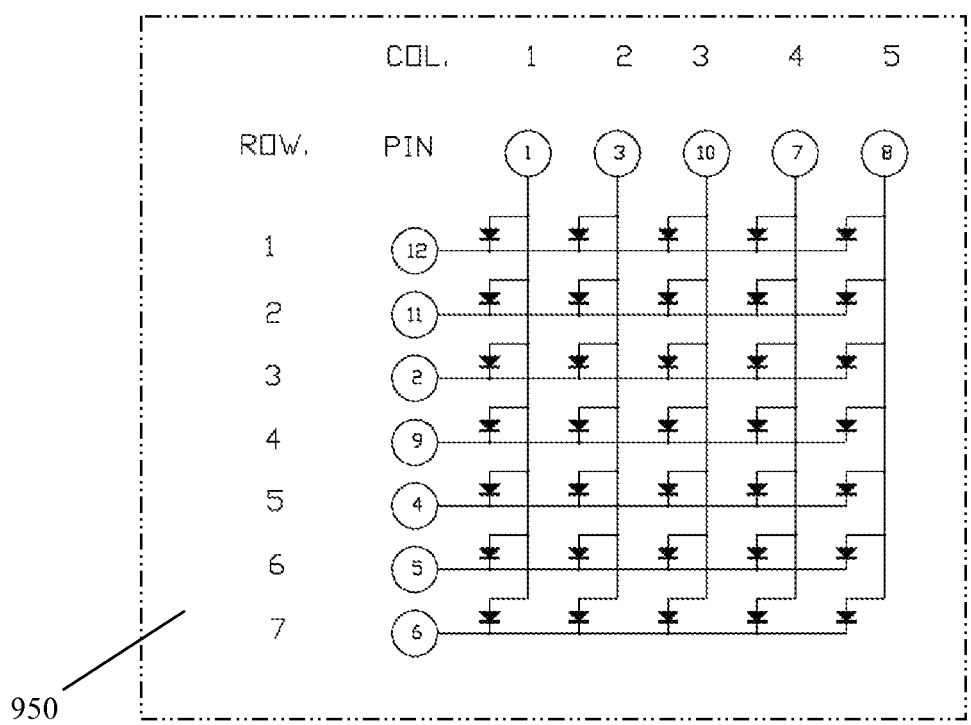
FIG. 9B illustrates a 35 element LED matrix display utilized in accordance with an embodiment of the invention.

The foregoing technique may be used to drive LED array 950, as shown in FIG. 9B. Any of the 35 LEDs in array 950 may be activated by sending 5 signals to the common anode terminals and 7 signals to the common cathode terminals of LED array 950. LED array 950 may be purchased from Lit-eOn Corporation located in Milpitas, Calif. as part number LTP-747.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for finding a machine tool origin, comprising:
   a base;
   a sensor positioned on a first side of the base, wherein the sensor includes probe engagement components and electronic circuitry, wherein the probe engagement components are configured for movable engagement with a probe of the machine tool to produce electronic signals processed by the electronic circuitry to provide a signal indicative of the machine tool origin; and
   mechanical positioning components positioned on a second side of the base, the mechanical positioning components including a pedestal with a first tab and a second tab aligned to be operable as a mechanical stop with the first tab corresponding to a position of a left-hand origin for the machine tool and the first tab and a third tab aligned to be operable as a mechanical stop with the first tab corresponding to a position of a right-hand origin for the machine tool.

2. The apparatus of claim 1 wherein the probe engagement components include a first flexure with a first fin for movable engagement with the probe along a first axis and a second flexure with a second fin for movable engagement with the probe along a second axis.

3. The apparatus of claim 1 wherein the electronic circuitry includes signal sensing circuitry and signal processing circuitry.

4. The apparatus of claim 3 wherein the signal sensing circuitry includes optical signal sensing circuitry.

5. The apparatus of claim 3 wherein the signal sensing circuitry includes capacitive signal sensing circuitry.

6. The apparatus of claim 3 wherein the signal processing circuitry processes signals from the signal sensing circuitry to provide an indication of probe position.

7. The apparatus of claim 3 wherein the signal processing circuitry processes an offset signal.

8. The apparatus of claim 1 wherein the electronic circuitry includes probe position output circuitry.

9. The apparatus of claim 8 wherein the probe position output circuitry includes a digital display indicative of a probe position.

10. The apparatus of claim 8 wherein the probe position output circuitry includes a single LED operative to provide a visible output signal when the apparatus identifies the machine tool origin.

11. The apparatus of claim 8 wherein the probe position output circuitry includes an array of LEDs operative to provide visible output signals indicative of a probe position.

12. The apparatus of claim 1 wherein the mechanical positioning components are configured for positioning on parallels of the machine tool.

13. The apparatus of claim 1 wherein the mechanical positioning components are configured for positioning between clamp jaws of the machine tool.

14. The apparatus of claim 13 wherein the mechanical positioning components include posts for engagement with the clamp jaws of the machine tool.

15. The apparatus of claim 1 wherein the sensor includes mechanical calibration components.

16. The apparatus of claim 15 wherein the mechanical calibration components include a lever rotatable on a shaft for engagement with a probe engagement component in a first position.

17. The apparatus of claim 15 wherein the mechanical calibration components include a lever rotatable on a shaft to establish a stowed position.

18. The apparatus of claim 1 further comprising a wireless remote control.

* * * * *